(12) United States Patent
Hwang et al.

(10) Patent No.: US 8,588,176 B2
(45) Date of Patent: Nov. 19, 2013

(54) SYSTEM AND METHOD FOR PERFORMING HANDOVER IN WIMAX MOBILE COMMUNICATION SYSTEM

(75) Inventors: Seong-Taek Hwang, Pyeongtaek-si (KR); Shuangfeng Han, Suwon-si (KR); Chunhui Zhou, Beijing (CN); Jing Wang, Beijing (CN); Ming Zhao, Beijing (CN); Zheng Xu, Beijing (CN)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 879 days.

(21) Appl. No.: 12/034,706

(22) Filed: Feb. 21, 2008

(65) Prior Publication Data

US 2008/0198808 A1    Aug. 21, 2008

(30) Foreign Application Priority Data

Feb. 21, 2007    (KR) .................. 10-2007-0017440

(51) Int. Cl.
*H04W 4/00*    (2009.01)

(52) U.S. Cl.
USPC ........... 370/331; 455/437; 455/444; 455/439; 455/440; 455/422.1

(58) Field of Classification Search
USPC ................................. 370/310–350; 455/436
See application file for complete search history.

(56) References Cited

U.S. PATENT DOCUMENTS

| | | | | |
|---|---|---|---|---|
| 4,475,010 A | * | 10/1984 | Huensch et al. | 370/334 |
| 4,485,486 A | * | 11/1984 | Webb et al. | 455/450 |
| 5,339,184 A | * | 8/1994 | Tang | 398/116 |
| 5,548,806 A | * | 8/1996 | Yamaguchi et al. | 455/441 |
| 5,621,786 A | * | 4/1997 | Fischer et al. | 455/436 |
| 5,628,052 A | * | 5/1997 | DeSantis et al. | 455/562.1 |
| 5,642,405 A | * | 6/1997 | Fischer et al. | 455/444 |
| 5,648,961 A | * | 7/1997 | Ebihara | 370/282 |
| 5,657,374 A | * | 8/1997 | Russell et al. | 370/328 |
| 5,809,422 A | * | 9/1998 | Raleigh et al. | 455/449 |
| 5,920,818 A | * | 7/1999 | Frodigh et al. | 455/443 |
| 5,953,668 A | * | 9/1999 | Reilly | 455/442 |
| 6,009,326 A | * | 12/1999 | Roder et al. | 455/436 |

(Continued)

FOREIGN PATENT DOCUMENTS

| | | |
|---|---|---|
| EP | 1250018 A1 | 10/2002 |
| JP | 2000-253436 | 9/2000 |
| KR | 2005-119054 | 12/2005 |
| KR | 10-0678096 | 1/2007 |

OTHER PUBLICATIONS

Yijun Mo ("Handoff in Virtual Cell System Based on Distributed Antenna", Wireless Communications, Networking and Mobile Computing 2006, WiCOM 2006, Issue Date: Sep. 22-24, 2006).*

(Continued)

*Primary Examiner* — Ian N Moore
*Assistant Examiner* — Dung B Huynh
(74) *Attorney, Agent, or Firm* — Cha & Reiter, LLC

(57) ABSTRACT

Disclosed is a system and a method for performing handover in a Worldwide interoperability for Microwave Access (WiMAX) mobile communication system supporting broadband wireless access. The system includes a plurality of Mobile Stations (MSs); at least one distributed antenna having the ability to perform simultaneous communications with the plurality of MSs; and a base station connected to the at least one distributed antenna through optical fibers for performing communications and handovers with the multiple MSs.

13 Claims, 5 Drawing Sheets

(56) References Cited

U.S. PATENT DOCUMENTS

| | | | |
|---|---|---|---|
| 6,035,199 A * | 3/2000 | Barnett | 455/448 |
| 6,069,871 A * | 5/2000 | Sharma et al. | 370/209 |
| 6,151,512 A * | 11/2000 | Chheda et al. | 455/562.1 |
| 6,161,014 A * | 12/2000 | Girardeau et al. | 455/436 |
| 6,167,036 A * | 12/2000 | Beven | 370/331 |
| 6,477,154 B1 | 11/2002 | Cheong et al. | |
| 6,487,416 B1 * | 11/2002 | Bundy et al. | 455/453 |
| 6,567,665 B1 * | 5/2003 | Kissee | 455/436 |
| 6,732,177 B1 * | 5/2004 | Roy | 709/227 |
| 6,801,758 B2 * | 10/2004 | Nagata | 455/101 |
| 6,901,061 B1 * | 5/2005 | Joo et al. | 370/335 |
| 7,031,277 B2 * | 4/2006 | Choi et al. | 370/331 |
| 7,065,353 B1 * | 6/2006 | Bolinth et al. | 455/426.1 |
| 7,171,206 B2 * | 1/2007 | Wu | 455/438 |
| 7,266,100 B2 * | 9/2007 | Le et al. | 370/331 |
| 7,369,856 B2 * | 5/2008 | Ovadia | 455/439 |
| 7,430,168 B2 * | 9/2008 | Yamaura et al. | 370/230.1 |
| 7,773,562 B2 * | 8/2010 | Grieco | 370/331 |
| 7,929,487 B2 * | 4/2011 | Van Wijngaarden et al. | 370/328 |
| 2001/0033600 A1 * | 10/2001 | Yang et al. | 375/130 |
| 2002/0016170 A1 * | 2/2002 | Sabat et al. | 455/436 |
| 2002/0187785 A1 | 12/2002 | Iizuka | |
| 2003/0007214 A1 * | 1/2003 | Aburakawa et al. | 359/145 |
| 2003/0129982 A1 * | 7/2003 | Perini | 455/442 |
| 2003/0161284 A1 * | 8/2003 | Chen | 370/331 |
| 2004/0106412 A1 * | 6/2004 | Laroia et al. | 455/448 |
| 2004/0157600 A1 * | 8/2004 | Stumpert et al. | 455/432.1 |
| 2004/0203787 A1 * | 10/2004 | Naghian | 455/437 |
| 2004/0247278 A1 * | 12/2004 | Hirano et al. | 385/147 |
| 2005/0085265 A1 * | 4/2005 | Laroia et al. | 455/560 |
| 2005/0088992 A1 | 4/2005 | Bolin et al. | |
| 2005/0124345 A1 * | 6/2005 | Laroia et al. | 455/437 |
| 2005/0135811 A1 * | 6/2005 | Lee et al. | 398/139 |
| 2005/0192010 A1 * | 9/2005 | Kirla | 455/438 |
| 2005/0220054 A1 * | 10/2005 | Meier et al. | 370/331 |
| 2005/0232212 A1 * | 10/2005 | Kang et al. | 370/338 |
| 2006/0056351 A1 * | 3/2006 | Wall | 370/331 |
| 2006/0159050 A1 * | 7/2006 | Kim et al. | 370/331 |
| 2006/0234709 A1 * | 10/2006 | Marinescu et al. | 455/436 |
| 2006/0250935 A1 * | 11/2006 | Hamamoto et al. | 370/203 |
| 2006/0252428 A1 * | 11/2006 | Agashe et al. | 455/436 |
| 2007/0019959 A1 * | 1/2007 | Retnasothie et al. | 398/115 |
| 2007/0097945 A1 * | 5/2007 | Wang et al. | 370/349 |
| 2007/0149199 A1 * | 6/2007 | Kanagawa | 455/436 |
| 2007/0173243 A1 * | 7/2007 | Li | 455/422.1 |
| 2007/0191013 A1 * | 8/2007 | Gunnarsson et al. | 455/438 |
| 2007/0224989 A1 * | 9/2007 | Soong et al. | 455/436 |
| 2007/0280370 A1 * | 12/2007 | Liu | 375/267 |
| 2007/0293225 A1 * | 12/2007 | Kangude et al. | 455/436 |
| 2008/0132239 A1 * | 6/2008 | Khetawat et al. | 455/438 |
| 2008/0205342 A1 * | 8/2008 | Radhakrishnan et al. | 370/331 |
| 2008/0267142 A1 * | 10/2008 | Mushkin et al. | 370/338 |
| 2009/0022089 A1 * | 1/2009 | Rudrapatna | 370/328 |
| 2009/0042571 A1 * | 2/2009 | Ishii et al. | 455/436 |
| 2010/0238903 A1 * | 9/2010 | Kitazoe | 370/332 |
| 2011/0130164 A1 * | 6/2011 | Sagae et al. | 455/517 |

OTHER PUBLICATIONS

Mo, Yijun, et al.; "Handoff in Virtual Cell System Based on Distributed Antenna;" IEEE Technical Paper; Sep. 22-24, 2006; 4 pgs.

You, Xiao-hu, et al.; "Distributed Radio and Cellular Mobile Communications Network Architecture;" Acta Electronica Sinica, vol. 32, No. 12A; Dec. 2004; 6pgs.

Wang, Ting, et al.; "Optical Wireless Integration at Network Edge;" 5th International Conference on Optical Internet (COIN 2006); Jul. 9, 2006;XP002485162.

* cited by examiner

SYSTEM AND METHOD FOR PERFORMING HANDOVER IN WIMAX MOBILE COMMUNICATION SYSTEM

CLAIM OF PRIORITY

This application claims the benefit under 35 U.S.C. §119(a) of an application entitled "System and Method for Performing Handover in WiMAX Mobile Communication System" filed in the Korean Industrial Property Office on Feb. 21, 2007 and assigned Serial No. 2007-17440, the entire contents of which are hereby incorporated by reference.

BACKGROUND OF THE INVENTION

1. Field of the Invention

The present invention relates to a broadband wireless communication system, and more particularly to a system and a method for performing handover in a Worldwide interoperability for Microwave Access (WiMAX) mobile communication system supporting a Point-to-MultiPoint (PMP) scheme.

2. Description of the Related Art

The next generation communication system is continuing to develop in such a way that a Mobile Station (MS) is offered various and plentiful high-speed services.

An exemplary instance of the next generation communication system is a WiMAX communication system corresponding to a communication system based on Institute of Electrical and Electronics Engineers (IEEE) 802.16 standard.

In general, the WiMAX mobile communication system is based on IEEE 802.16e Wireless Metropolitan Area Network (WMAN) standards ensuring mobility of the MS, and supports Broadband Wireless Access (BWA). A network structure supported by the IEEE 802.16 standard is operates in accordance with two schemes, including a mesh scheme and the PMP scheme.

Presently, in some nations and regions, the WiMAX mobile communication system having the PMP structure is being used as a test or for commercial purposes. This WiMAX mobile communication system is worthy of close attention with respect to the aspects of high-speed data communications, the maximum communication range, and relatively cheap costs. However, problems have been raised in that the WiMAX mobile communication system having the PMP structure spends high costs in installing hot zones each of which functions as a wireless Local Area Network (LAN) base station (BS) for relaying radio waves so as to service a plurality of user MSs and their frequent movements, and installing the hot zones has no other option than to concentrate in a limited area, such as a crowded downtown, or a university library.

Therefore, a reform measure using Multiple Input Multiple Output (MIMO) or cell division technology is essential in respect to these hot zones.

In relation to this, FIG. 1 illustrates a general cellular system in which the prior cell is divided into multiple small cells. Usually, in a mobile communication system having the cellular structure, a base station (BS) controls one cell, and offers services to an MS located in the cell. Referring to FIG. 1, as a service coverage area is divided into multiple small zones through the cell division causing the radius of one cell to change from R to R/2, the same frequency is used in two cells that are far away from each other. A frequency reuse factor (i.e., the number of cells representing how many cells are assigned the total frequency band) can increase the total capacity of a cellular system in an environment like above. Therefore, a cell in which traffic congestion occurs is divided into smaller subcells or micro-cells, and there exists a BS in each subcell or micro-cell itself.

In this manner, since an increase of the number of cells is matched with the reproductively of cells, i.e., an increase in the reusability of cells, the cell division causes the total capacity of the cellular system to increase whereas a burden is imposed on control over an upper layer due to a frequent handover procedure between cells setting call from a base station (i.e., from a serving base station) of a current cell caused by the cell division to a base station of another cell target (i.e., to a target base station).

SUMMARY OF THE INVENTION

Accordingly, the present invention provides a system and a method for using a base station to perform handover in a WiMAX mobile communication system, which eliminates frequent handover between cells and a corresponding burden on an upper layer caused by the frequent handover performing handover.

In accordance with a first exemplary embodiment of the present invention, there is provided a system for performing handover in a Worldwide interoperability for Microwave Access (WiMAX) mobile communication system supporting broadband wireless access, including: a plurality of Mobile Stations (MSs); a distributed antenna having the ability to perform simultaneous communications with at least one of the plurality of MSs; and a base station (BS) connected to the distributed antenna through optical fibers for performing communications and handovers with the plurality of MSs.

In accordance with another exemplary embodiment of the present invention, there is provided a method for performing handover in a Worldwide interoperability for Microwave Access (WiMAX) mobile communication system supporting broadband wireless access, including the steps of: receiving information on a distributed antenna to perform handover from a Mobile Station (MS) through the distributed antenna; distinguishing from other processing stacks a relevant processing stack corresponding to the received information; and transmitting a handover message with the relevant processing stack if there exists the relevant processing stack corresponding to the received information.

BRIEF DESCRIPTION OF THE DRAWINGS

The above and other exemplary features, aspects, and advantages of the present invention will be more apparent from the following detailed description taken in conjunction with the accompanying drawings, in which.

DETAILED DESCRIPTION OF THE INVENTION

Hereinafter, exemplary embodiments of the present invention are described in detail with reference to the accompanying drawings. The detailed description includes particulars, such as specific configuration elements, which are only presented in support of more comprehensive understanding of the present invention, and it will be obvious to those skilled in the art that prescribed changes in form and modifications may be made to the particulars in the scope of the present invention.

Figure 1:
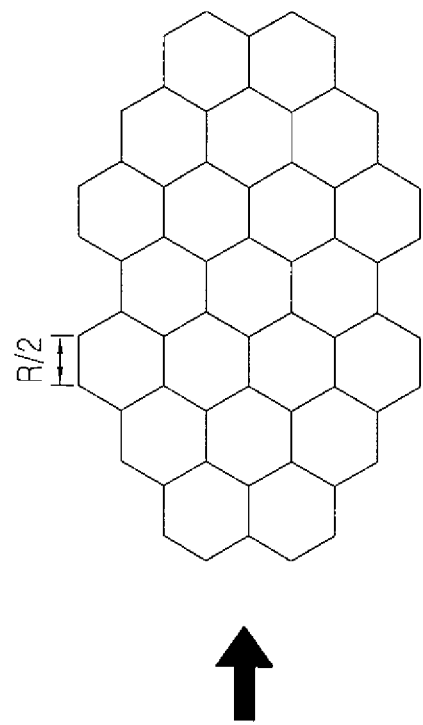
FIG. 1 illustrates a general cellular system in which a prior cell is divided into multiple smaller cells.
Figure 1:
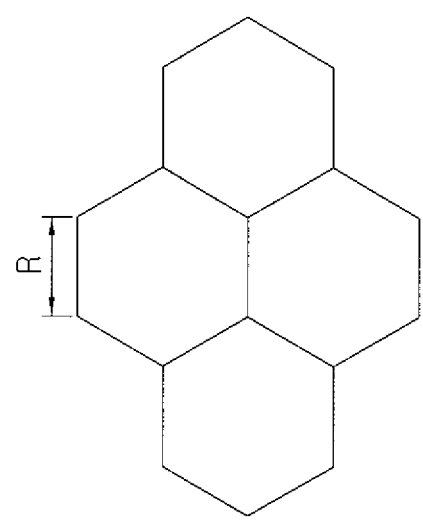
Figure 2:
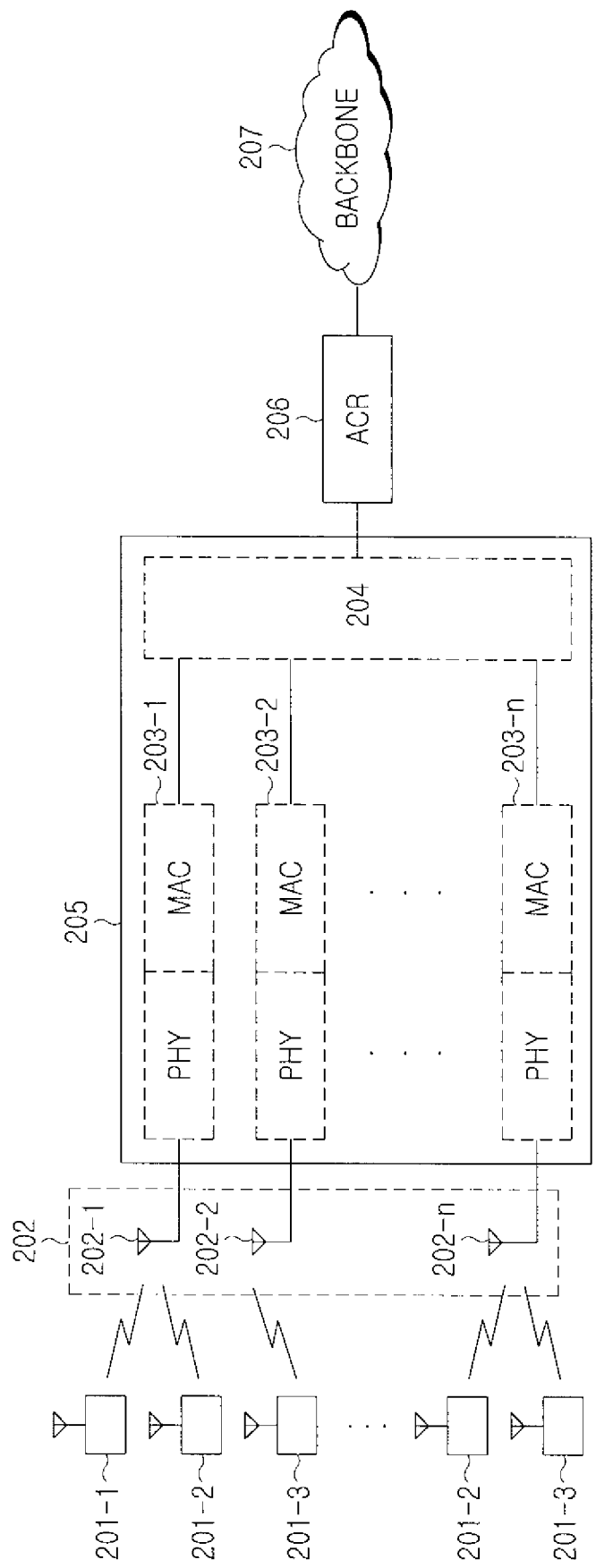
FIG. 2 is a block configuration diagram illustrating a system for performing a handover in a WiMAX mobile communication system, according to an embodiment of the present invention.

FIG. 2 is a block configuration diagram illustrating a system for performing a handover in a WiMAX mobile communication system according to an embodiment of the present invention. With reference to FIG. 2, the WiMAX mobile communication system according to an embodiment of the present invention includes a plurality of user MSs 201, at least one distributed antenna 202, a BS 205 comprising a plurality of processing stacks 203 and a network access control unit 204 for control thereof, an Access Control Router (ACR) 206, and a backbone 207. Herein, the at least one distributed antenna 202 can communicate with at least one of the plurality of user MSs 201. The plurality of processing stacks 203 are each connected to one of the at least one distributed antenna 202 through optical fibers, and correspond to the one of the at least one distributed antenna 202, respectively. The BS 205 includes the plurality of processing stacks 203 and the network access control unit 204, and communicates with the plurality of user MSs 201. The ACR 206 controls the BS 205, and performs a connection to another network. The backbone 207 is connected to another network, and delivers data to the ACR 206.

First, each MS of the plurality of user MSs 201 performs communication with the BS 205 in order to gain access to a network system according to a request for a call connection and a channel condition at its location. At this time, each of the MSs 201 selects at least one of the at least one distributed antenna 202 to which each of the MSs 201 can communicate with an optimal signal power and signal quality (i.e., the service quality) within a neighboring distance of its location in order to receive communication services from the BS 205 or for a call connection with another MS, and communicates with the BS 205.

Also, the selected at least one of the at least one distributed antenna 202 equipped with a transceiver for performing conversion between a Radio Frequency (RF) signal and a digital Intermediate Frequency (IF) signal corresponds to at least one distributed antenna located in a range where each of the at least one distributed antenna 202 can communicate with the base station 205 for performing a transmitted digital IF signal processing.

Thus, the plurality of MSs 201 communicate with the at least one distributed antenna 202 belonging to the same BS, and each of the at least one distributed antenna 202 is connected to the BS 205 through optical fibers, which in turn forms a cell corresponding to a range over which one BS has control. Also, the at least one distributed antenna 202 located within a certain zone over which a single BS has control forms at least one subcell in an area where radio waves broadcast from each of the at least one distributed antenna 202 *i* reach.

At this point, the BS 205 connected through optical fibers to the at least one distributed antenna 202, each of which forms at least one subcell, is equipped with the plurality of processing stacks 203 respectively corresponding to the at least one distributed antenna 202 to which the BS 205 gains access and transmits, to the network access control unit 204, position information from each of the at least one distributed antenna 202 and information about the communicating MSs. The network access control unit 204 distinguishes between information transmitted by each respective at least one distributed antenna 202 and received by the plurality of processing stacks 203, and then directs, on the basis of distinguished information, that one of the ACR 206 and a specific processing stack of the plurality of processing stacks 203 perform handover of the MSs 201. If the relevant processing stack corresponding to received information is prevented from inputting the received information the ACR 206 is directed to perform the handover.

The ACR 206, directed to perform the handover by the network access control unit 204 in the BS 205, transmits this direction to another network via the backbone 207, and the specific processing stack transmits the indication to the MSs 201 via the distributed antenna of the at least one distributed antenna 202 that is connected to the specific processing stack.

Figure 3:
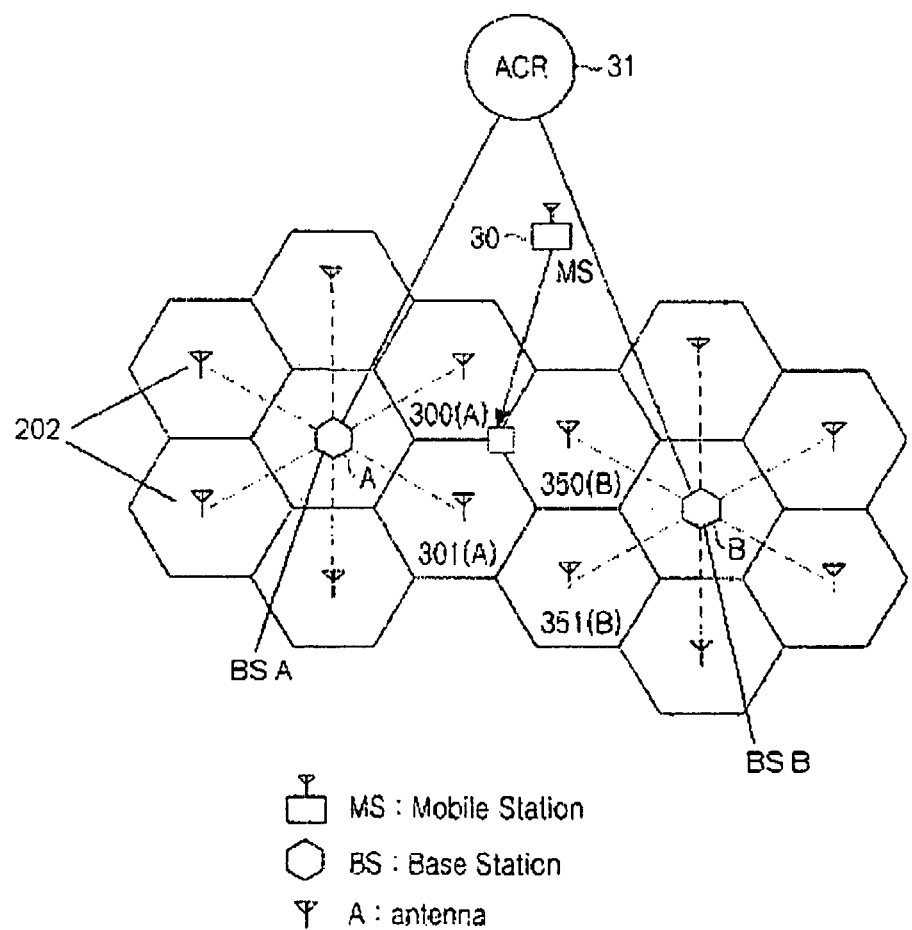
FIG. 3 is a configuration view illustrating a connection state between cells having a distributed antenna different from each other, according to an embodiment of the present invention.

FIG. 3 is a configuration view illustrating a connection state between cells having a distributed antenna different from each other according to the present invention. As illustrated in FIG. 3, there exist a base station A and a base station B of each cell including subcells by respective at least one distributed antennas 202, wherein the BS A or B controls subcells within a zone where the BS A or B can perform communication. Herein, an MS 30 offered services from the BS A via a distributed antenna 300A moves to a boundary point of the subcell where the distributed antenna 300A is located, and is about to change its service route from a route through the distributed antenna 300A to another route through a distributed antenna 301A within the same cell or to another route through a distributed antenna 350B within another cell. Accordingly, with reference to FIGS. 4 and 5, a description will be made of a process for performing handover between cells and between subcells over which the BS A and the BS B control, respectively.

Figure 4:
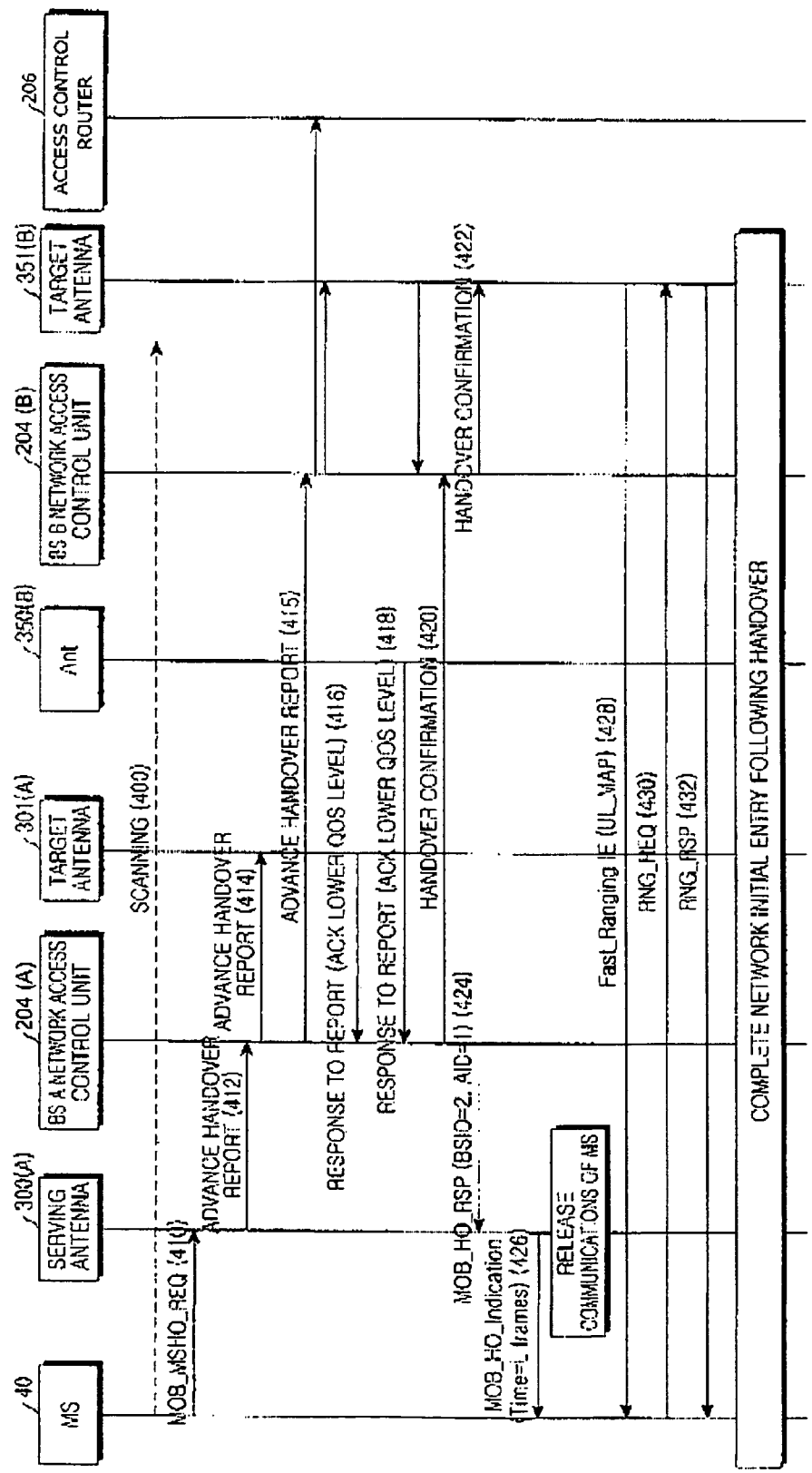
FIG. 4 is a flowchart illustrating signals while performing handover between cells of base stations different from each other in a WiMAX mobile communication system, according to an embodiment of the present invention.

FIG. 4 is a flowchart illustrating signals while performing handover between cells in a WiMAX mobile communication system according to an embodiment of the present invention. As illustrated in FIG. 4, first, an MS 40 is obtaining access to an antenna (i.e., a serving antenna 300A) to which the MS 40 is gaining current access, and communicates with the BS A.

When the above MS 40 moves, before performing handover, the MS 40 scans for distributed antennas located within a neighboring distance so as to select an antenna through which the MS 40 can communicate with an optimal quality and power of signal (step 400). Then, in order to search for a target antenna, the MS 40 needs to acquire information on adjacent antennas which the MS 40 itself obtained by scanning for adjacent antennas or can be provided from a serving BS that is offering services. Herein, the information on adjacent antennas signifies a position of a distributed antenna, received signal strength indication, and the like.

If at least one objective antenna (i.e., a target antenna) is determined through scanning for the antennas in step 400, the MS 40 transmits a MOB_MSHO_REQ message requesting handover to the BS A within a current service area via the serving antenna 300A to which the MS 40 is gaining access, and the MS 40 or the serving BS 300A selects and recommends the target antennas 301A and 350B satisfying the service quality by monitoring preset frequency bands (step 410). At this time, the MOB_MSHO_REQ message transmitted by the MS 40 corresponds to a message prescribed in the IEEE 802.16e standards.

A specific processing stack which is connected to the serving antenna 300A among the plurality of processing stacks included in a serving BS A, and which has received a handover request from the MS 40 via the serving antenna 300A, transmits the information on the target antennas 301A and 350B recommended by the MS 40 to the network access control unit 204. The network access control unit 204 distinguishes the selected target antenna and the specific processing stack, and transmits the handover message to Media Access Control (MAC) layers of the relevant processing stack (step 412). Herein, the handover message includes IDentification (ID) of the MS, a request for bandwidth, a request for Quality of Service (QoS), and the like.

At this moment, if the target antenna 301A connected to the processing stack exists within the serving BS A to which the MS 40 currently belongs, the handover message is directly transmitted to an antenna located in a service zone of the same BS by the network access control unit 204 (step 412). When a processing stack connected to the target antenna 350B does not exist within the current serving BS A, the target antenna 350B corresponds to an antenna located in a service zone of another BS. Accordingly, the network access control unit 204 transmits the handover message to the ACR 206 (steps 414 and 415). Respective MAC layers related to the target antennas 301A and 350B receiving the handover message from the network access control unit of the serving BS A, respond to the network access control unit 204 of the BS A (steps 416 and 418). Namely, the target antennas 301A and 350B transmit a response (ACK lower QoS level) answering to whether the handover can be performed according to the handover request of the MS 40 (steps 416 and 418), including information on frequency bandwidth and a service level which can be provided by each target antenna when the handover of the MS 40 is delivered to each target antenna.

More particularly, by analyzing the handover message received from the network access control unit of the serving BS A, when the MS 40 is required for the handover, the MS 40 selects, as the final target antenna through which the MS 40 accomplishes the handover, a target antenna that can optimally provide the frequency bandwidth and the service level required by the MS 40. Further, an interface for exchanging information with the network in the network access control unit corresponds to an interface used by one of the protocols selected from the group consisting of Internet Protocol (IP) and Asynchronous Transfer Mode (ATM).

To give an example, if it is assumed that a service level that the target antenna 301A can provide is lower than a service level required by the MS 40, and a service level that the target antenna 350B can provide equals the service level required by the MS 40, the serving BS A selects the target antenna 350B as the final target antenna through which the MS 40 accomplishes the handover.

Therefore, when the target antenna 305B belonging to the BS B easily satisfies a request for QoS of the MS 40 requesting the handover, the serving BS A transmits a response message related to handover acceptance to the BS B through the backbone by way of the ACR, and gives notice that the handover of the MS 40 is about to be delivered to the target antenna 350B belonging to the BS B (step 420). Meanwhile, as the target antenna 350B is finally selected, a network access control unit in the BS B transmits a message to a MAC layer of a processing stack connected to the target antenna 350B.

Then, the serving BS A transmits a MOBile subscriber station HandOver ReSPonse (MOB_HO_RSP) message to the serving antenna 300A (step 424), and recommends a change over to the target antenna 350B. Herein, the MOB_HO_RSP includes information on the target antenna to which the handover of the MS 40 is delivered. Also, the above information signifies a message type to be transmitted, time it is expected to begin a handover procedure, and information on a target antenna selected by the serving BS A.

In order to select the target antenna 350B to which the handover is to be delivered, the serving antenna 300A receiving the MOB_BSHO_RSP message transmits, to the MS 40, a MOBile subscriber station HandOver INDication (MOB_HO_IND) message corresponding to a message responding to the MOB_BSHO_RSP message (step 426). After sensing that the handover is to be delivered to the target antenna 350B included in the MOB_HO_IND message, the MS 40 receiving the MOB_HO_IND message responds to the MOB_HO_IND, displays time necessary to perform a handover operation, and releases communications with the serving antenna 300A currently gaining access to the MS 40 (step 426).

Next, the MS 40 receives a Fast_Ranging Information Element (IE) (UL_MAP) message from the target antenna 350B (step 428). The UL_MAP message includes an MS initial search opportunity which is based on non-contention. The Fast_Ranging is performed whenever there exists a request from a BS so that the BS may acquire synchronization with an MS of a subscriber. The Fast_Ranging matches the MS of the subscriber with the BS for an accurate time offset therebetween, and is performed so as to adjust transmitted power. Namely, after being powered on, the MS of the subscriber acquires the synchronization with the BS on receiving UL_MAP, and performs the Fast_Ranging in order to adjust the transmitted power. By using the initial search opportunity, the MS 40 transmits an RNG_REQ message to the serving antenna 300A (step 430). The MS 40 exchanges the RNG_REQ message and an RNG_RSP message with the serving antenna 300A (step 432), establishes a normal operation state, and then completes a process for performing the handover.

Figure 5:
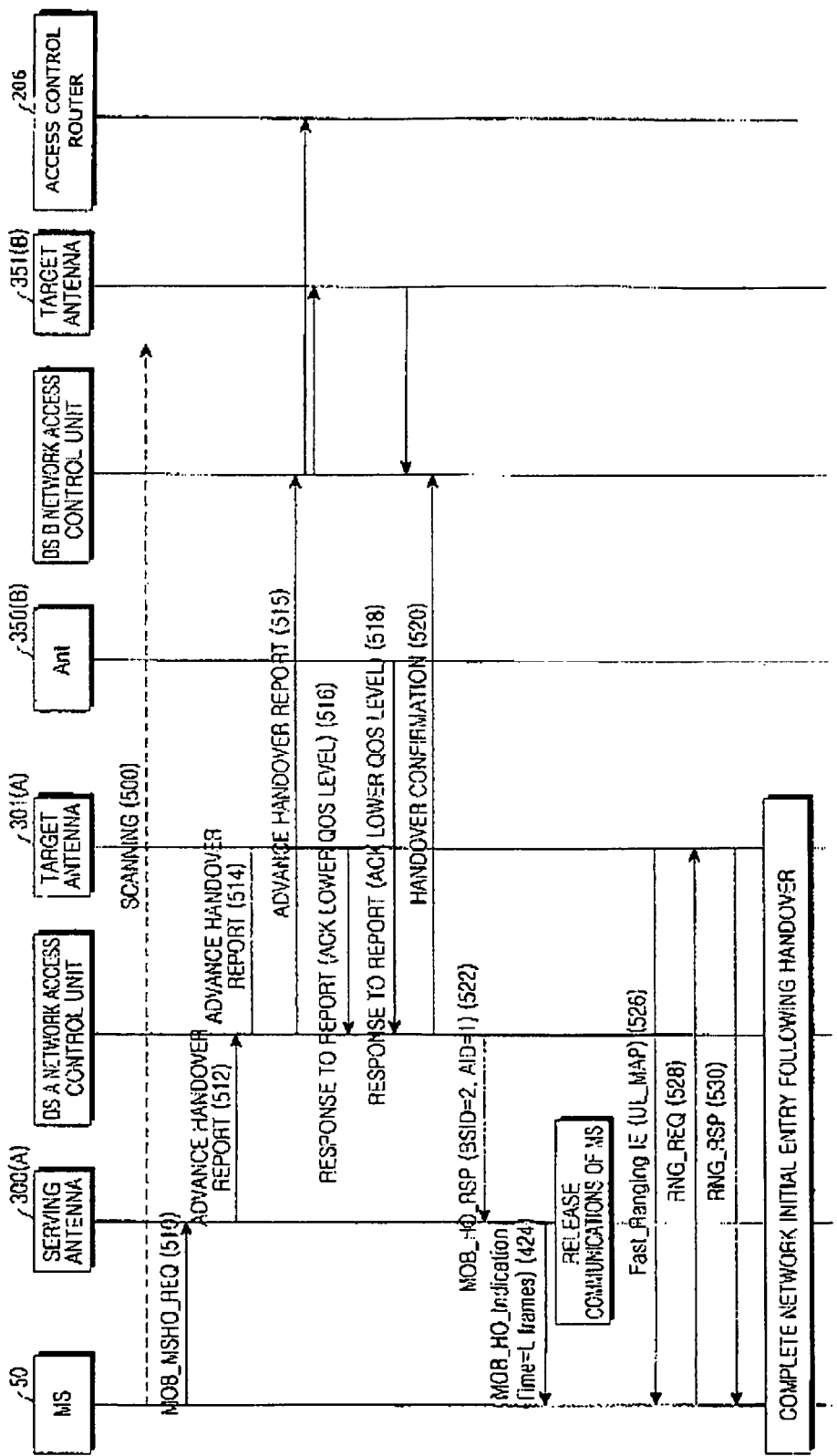
FIG. 5 is a flowchart illustrating signals while performing handover between subcells of the same base station in a WiMAX mobile communication system, according to another embodiment of the present invention.

FIG. 5 is a flowchart illustrating signals while performing handover between subcells in a WiMAX mobile communication system according to another embodiment of the present invention. As illustrated in FIG. 5, an MS 50 is obtaining access to an antenna (i.e., a serving antenna 300A) to which the MS 50 is gaining current access, and communicates with a network access control unit of the BS A. When the above MS 50 moves, before performing handover, the MS 50 scans for distributed antennas located within a neighboring distance so as to select an antenna through which the MS 50 can communicate with an optimal quality and power of signal (step 500). If at least one objective antenna (i.e., a target antenna) is determined through scanning for the antennas in step 500, the MS 50 transmits a MOB_MSHO_REQ message requesting handover to the BS A within a current service area via the serving antenna 300A to which the MS 50 is gaining access, and the MS 50 or the serving BS 300A selects and recommends the target antennas 301A and 350B satisfying the requested service quality by monitoring preset frequency bands (step 510).

The information on the target antennas 301A and 350B recommended by the MS 50 is transmitted to the network access control unit in the serving BS A. The network access control unit distinguishes the selected target antenna and the specific processing stack, and transmits the handover message to Media Access Control (MAC) layers of the relevant processing stack (step 512). At this moment, if the target antenna 301A connected to the processing stack exists within the serving BS A to which the MS 50 currently belongs, the handover message is directly transmitted to an antenna located in a service zone of the same BS by the network access control unit (step 514), and if a processing stack connected to the target antenna 350B does not exist within the current serving BS A, the target antenna 350B corresponds to an antenna located in a service zone of another BS. Accordingly, the network access control unit transmits the handover message to the ACR 206 (step 515). Respective MAC layers related to the target antennas 301A and 350B receiving the handover message from the network access control unit of the serving BS A, respond to the network access control unit of the BS A. Namely, the target antennas 301A and 350B transmit a response (ACK lower QoS level) answering to whether the handover can be performed according to the handover request of the MS 50 (steps 516 and 518), including information on frequency bandwidth and a service level which can be provided by each target antenna when the handover of the MS 50 is delivered to each target antenna. Accordingly, when the target antenna 301A located in the same BS control area satisfies a request for QoS of the MS 50 requesting the handover, the target antenna 301A is selected (step 520). Namely, the handover related to the MS 50 is checked (step 520), and the serving BS A directly transmits a response message related to handover acceptance through the network access control unit because a target antenna 301A connected to the processing stack exists in the serving BS A to which the MS 50 currently belongs. Then, the serving BS A transmits a MOBile subscriber station HandOver ReSPonse (MOB_HO_RSP) message to the serving antenna 300A (step 522). Herein, the MOB_HO_RSP includes information on the target antenna to which the handover of the MS 50 is delivered.

In order to select the target antenna 301A to which the handover is to be delivered, the serving antenna 300A receiving the MOB_BSHO_RSP message transmits, to the MS 50, a MOBile subscriber station HandOver INDication (MOB_HO_IND) message corresponding to a message responding to the MOB_BSHO_RSP message (step 524). After sensing that the handover is to be delivered to the target antenna 301A included in the MOB_HO_IND message, the MS 50 receiving the MOB_HO_IND message responds to the MOB_HO_IND, displays time necessary to perform a handover operation, and releases communications with the serving antenna 300A currently gaining access to the MS 50. Next, the MS 50 receives a Fast_Ranging Information Element (IE) (UL_MAP) message from the target antenna 301A (step 526). By using the initial search opportunity, the MS 50 transmits an RNG_REQ message to the serving antenna 300A. The MS 50 exchanges the RNG_REQ message and an RNG_RSP message with the serving antenna 300A, establishes a normal operation state, and then completes a process for performing the handover.

The merits and effects of preferred embodiments, as disclosed in the present invention, and as so configured to operate above, will be described below.

As described above, according to the present invention, a frequent handover between cells and a burden of an upper layer caused by the frequent handover can be removed by using a base station to perform handovers. Furthermore, since only an antenna and transceiver are set up instead of providing a BS for each of the prior cells, there is no burden upon control over an upper layer due to cell division, and there is no need to change the structure of a backbone network and the interface, which in turn can reduce costs of an overall system.

While the invention has been shown and described with reference to certain exemplary embodiments thereof, it will be understood by those skilled in the art that various changes in form and details may be made therein without departing from the spirit and scope of the invention. Therefore, the spirit and scope of the present invention must be defined not by the herein described exemplary embodiments thereof but by the appended claims and equivalents of the appended claims.

What is claimed is:

1. A system for performing handover in a Worldwide interoperability for Microwave (WiMAX) mobile communication system supporting broadband wireless access, the system comprising:
   a plurality of Mobile Stations (MSs);
   a plurality of distributed antennas configured to perform simultaneous communications with at least one MS of the plurality of MSs; and
   a base station (BS) connected to at least one distributed antenna of the plurality of distributed antennas through optical fibers for directly performing handovers with each of the plurality of MSs, the base station having a plurality of processing stacks, each stack respectively connected to one of the at least one distributed antenna for performing communications;
   wherein the mobile station provides to the first base station information regarding at least one potential target distributed antenna, from the plurality of distributed antennas, to which the mobile station plan to communicate with;
   the base station determines based on the information whether the at least one potential target distributed antenna, of the plurality of distributed antennas, is located in a same service zone of the base station, transmits a handover message directly to a first distributed antenna of at least one potential target distributed antenna located in a same service zone of the same base station when the first distributed antenna of the least one potential target distributed antenna is connected, through the optical fibers, to one of the processing stacks within the same base station, and transmits the handover message to another base station when the first distributed antenna of the at least one potential target distributed antenna is not within the same service zone of the base station,
   wherein each stack of the plurality of processing stacks have a PHYisical (PHY) layer and a Media Access Control (MAC) layer; and a network access control unit, connected to each of the plurality of processing stacks and to the first network, for connecting and exchanging signals with the plurality of stacks and the first network, and for performing handover.

2. The system as claimed in claim 1, wherein the PHY layer and the MAC layer of each of the plurality of processing stacks are based on a predetermined Wireless Metropolitan Area Network (WMAN) communications protocol.

3. The system as claimed in claim 1, wherein an interface for exchanging information with the first network in the network access control unit corresponds to an interface used by one of the protocols selected from the group consisting of Internet Protocol (IP) and Asynchronous Transfer Mode (ATM).

4. The system as claimed in claim 1, wherein the first BS, the plurality of MSs and a set of associated distributed antennas of the plurality of distributed antennas form a cell corresponding to a range over which the first BS has communication control.

5. The system as claimed in claim 4, wherein each of the set of associated distributed antennas describes a range of one subcell.

6. The system as claimed in claim 5, wherein the subcell corresponds to an area where the describing distributed antenna of the subcell can communicate.

7. The system as claimed in claim 1, wherein each of the plurality of the associated distributed antennas describes a range of one subcell.

8. The system as claimed in claim 7, wherein the subcell corresponds to an area where the describing distributed antenna of the subcell can communicate.

9. The system as claimed in claim 1, wherein each of the plurality of distributed antennas further comprises a transceiver configured to perform conversion between a Radio Frequency (RF) signal and a digital Intermediate Frequency (IF) signal.

10. A method for performing handover in a Worldwide interoperability for Microwave (WiMAX) mobile communication system of the type having a plurality of mobile stations (MSs), a base station having a plurality of processing stacks in one to one connection to a plurality of distributed antennas through at least one optical fiber configured to communicate simultaneously with the at least one of the plurality of MSs, the method comprising:

receiving information regarding at least one potential target distributed antenna of the plurality of distributed antennas from at least one of the plurality of mobile stations through which the at least one mobile station plan to communicate;

determining based on the information whether the at least one potential target distributed antenna is located in a same service zone of the same base station to which the mobile station currently is communicating with, directly transmitting, from the base station, a handover message to a first distributed antenna of the at least one potential target distributed antenna operatively coupled to the at least one optical fiber located in a same service zone of the same base station when the first distributed antenna of the at least one potential target distributed antenna is connected to one of the processing stacks within the same base station, and transmitting the handover message to another base station when the first distributed antenna of the at least one potential target distributed antenna is not within the same service zone of the same base station, wherein the plurality of processing stacks each comprise a PHYsical (PHY) layer and a Media Access Control (MAC) layer based on a predetermined Wireless Metropolitan Area Network (WMAN) communications protocol.

11. The method as claimed in claim 10, further comprising transmitting the handover message to another base station via the Access Control Router (ACR).

12. The method as claimed in claim 10, wherein information on the potential target distributed antenna corresponds to an antenna which can communicate with the Mobile Station (MS) with an optimal signal power and an optimal signal quality.

13. The method as claimed in claim 10, wherein the transmitting step further comprises converting between a Radio Frequency (RF) signal and a digital Intermediate Frequency (IF) signal.

* * * * *